E. J. BANFIELD.
MACHINE FOR FINISHING BASE OR GAS CHECK PLUGS FOR ARTILLERY SHELLS.
APPLICATION FILED DEC. 4, 1915.
1,225,742.
Patented May 15, 1917.
2 SHEETS—SHEET 2.
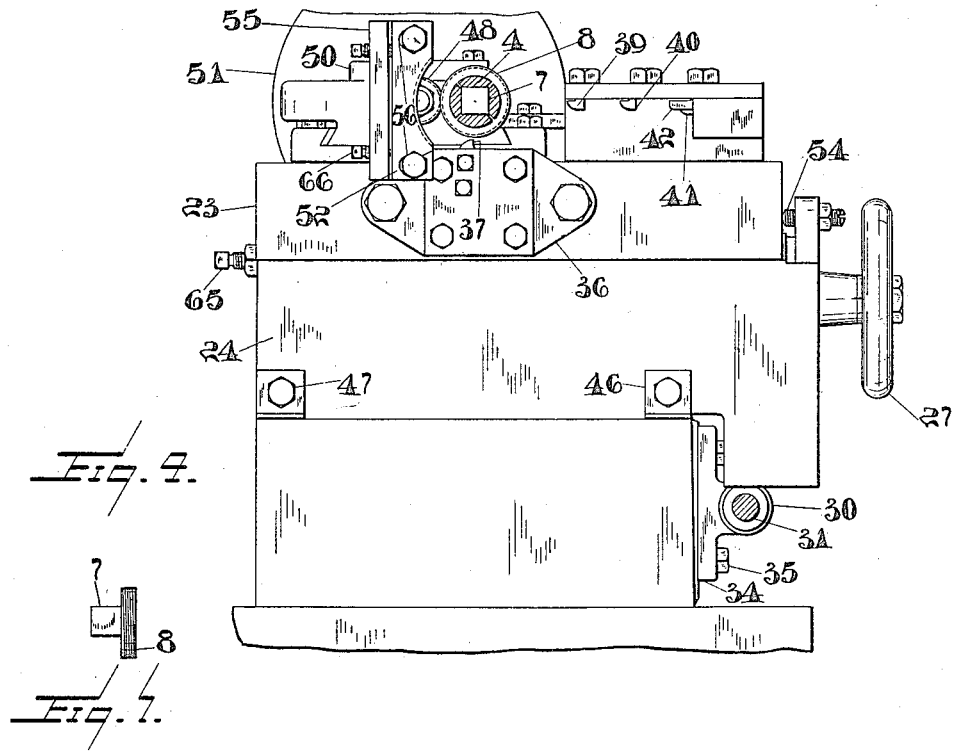
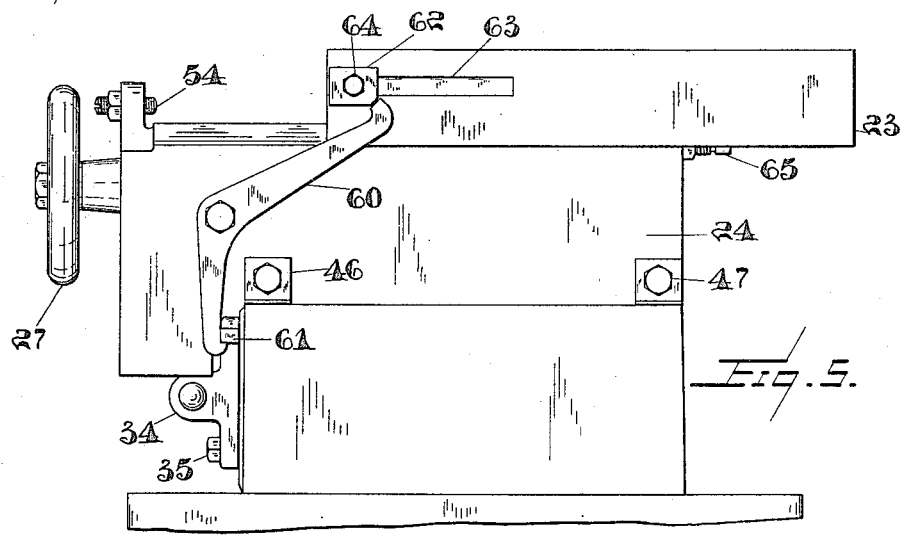
WITNESSES.
N. R. Tyndall.
E. P. Hall.
INVENTOR.
E. J. Banfield.
BY J. Edward Maybee.
ATTY.

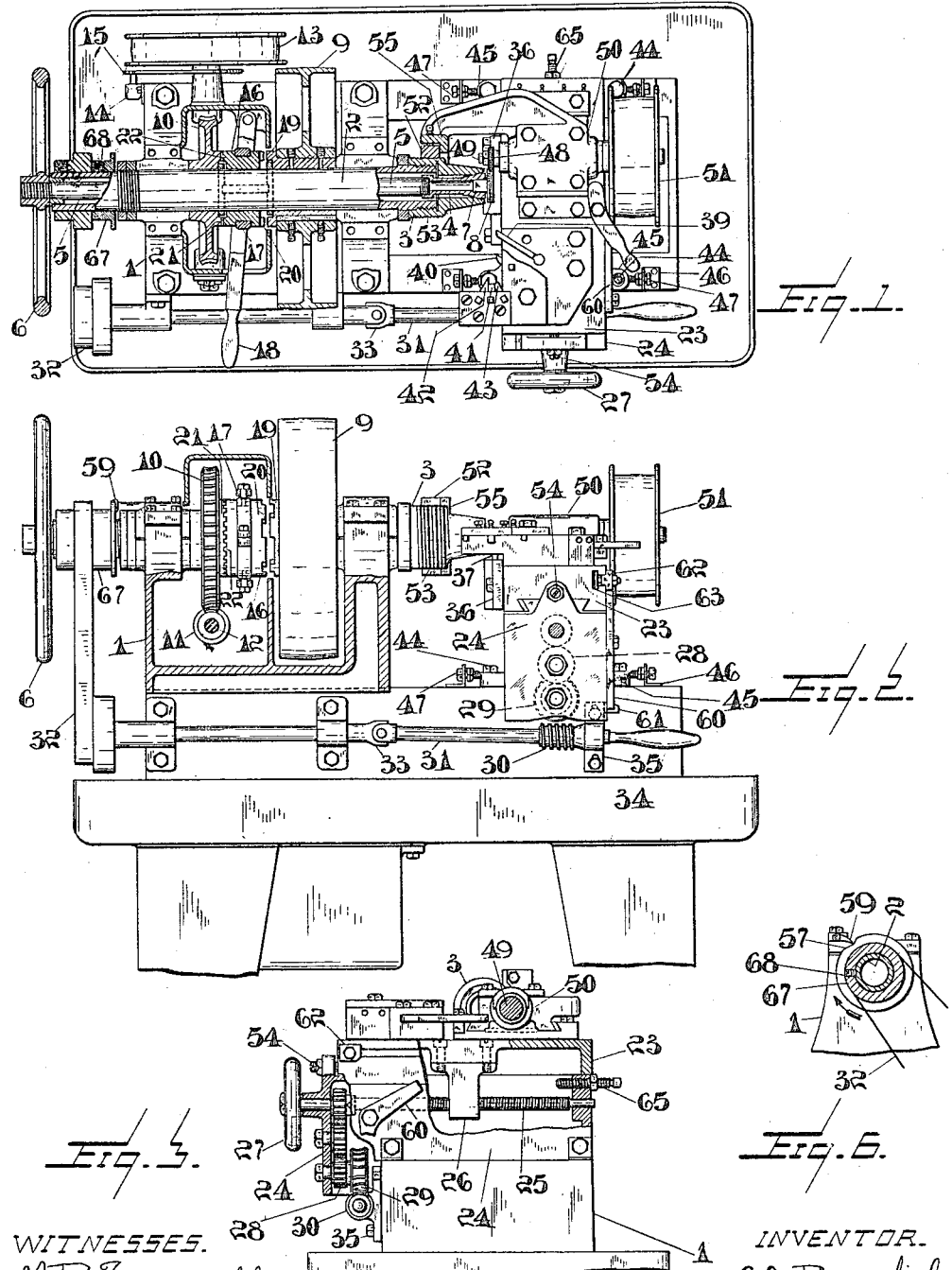

UNITED STATES PATENT OFFICE.

EDWIN J. BANFIELD, OF TORONTO, ONTARIO, CANADA.

MACHINE FOR FINISHING BASE OR GAS-CHECK PLUGS FOR ARTILLERY-SHELLS.

1,225,742.   Specification of Letters Patent.   Patented May 15, 1917.

Application filed December 4, 1915. Serial No. 65,114.

*To all whom it may concern:*

Be it known that I, EDWIN J. BANFIELD, of the city of Toronto, in the county of York, Province of Ontario, Canada, a subject of the King of Great Britain, have invented certain new and useful Improvements in Machines for Finishing Base or Gas-Check Plugs for Artillery-Shells, of which the following is a specification.

This invention relates to apparatus for facing and turning down and threading the plugs used in some types of artillery shells to close the opening formed in the base, and my object is to devise a machine capable of greater output than the lathes commonly employed, and which will be less expensive to build.

I attain my object by means of the special constructions hereinafter fully described, but which may be briefly set forth as follows: A hollow rotary spindle is employed provided at one end with a chuck and coöperating collet for holding plugs. The surfaces of the plug are finished by turning and the thread is cut by a milling cutter, and therefore two speeds of the spindle are needed, a very slow speed during milling and a high speed during turning.

For the high speed the spindle is directly driven by a belt, and for low speed by a worm gear, and a double clutch is employed to put the spindle on either low or high gear as needed, the clutch having a positive engagement for high gear and a positive engagement with fine cut teeth for low gear.

The turning tools and the milling cutter are carried on a tool carriage slidable transversely of the spindle on a suitable feed carriage, which is rotatable oscillatably the better to enable the plug to be turned with a coned face.

The tool carriage carries a roughing tool for trimming off the periphery of the disk operable with the carriage moving in one direction, and facing and periphery finishing tools operable with the tool carriage moving in the opposite direction. The milling cutter is brought into operation by moving the tool carriage to the limit of its movement in the direction in which it is moved to bring the roughing tool into operation. The milling cutter has its spindle supported in a bearing movable longitudinally of the apparatus to permit of the necessary longitudinal moving of the milling cutter in the process of cutting the thread on the periphery of the plug, and this movement is imparted to the milling cutter by a chaser engaging a thread turned on the periphery of the chuck.

The whole is constructed in detail substantially as hereinafter more specifically described and as illustrated in the accompanying drawings in which—

Figure 1 is a plan view, partly in section, of my improved tool;

Fig. 2 a side elevation partly in section;

Fig. 3 an end elevation partly broken away;

Fig. 4 an elevation of the inner face of the feed carriage and tool carriage on an enlarged scale;

Fig. 5 an end elevation of the same on the same scale;

Fig. 6 a sectional detail illustrating the stop on the spindle of the apparatus to determine the position of the external chuck thread relative to the chaser of the milling cutter; and Fig. 7 a side elevation of the plug.

In the drawings like numerals of reference indicate corresponding parts in the different figures.

1 is the frame of the apparatus suitably shaped to support the different parts. On this frame in suitable bearings is journaled the hollow spindle 2. This spindle is provided at its inner end with a chuck 3, with which coöperates the collet 4 on the end of the collet spindle 5.

The end of the collet spindle projects through the hollow spindle 2 and has its end provided with a left hand thread. On the threaded end of the collet spindle is screwed the hand wheel 6, the hub of which bears against the end of the hollow spindle. The collet 4 is split in the usual manner and its exterior surface is tapered to fit the correspondingly tapered internal periphery of the chuck. The collet is adapted to fit the squared shank 7 of the plug 8. This plug is shown most clearly in Fig. 7.

It is evident that by means of the hand wheel the plugs may be suitably gripped or released as required. The hollow spindle is arranged to be driven at either of two speeds by the hollowing mechanism.

A pulley 9, loose on the hollow spindle, forms the high speed driving means. This pulley will be directly driven by belt from the line or counter shaft. The low speed drive is by means of the worm wheel 10 also loose on the hollow spindle. This worm wheel is driven by means of the worm 11 on the worm spindle 12, on which is secured the pulley 13, by means of which the worm spindle may be driven from the line shaft.

From the worm spindle 11 the lubricator pump 14 is driven by means of the sprocket gearing 15. The pump 14 will be used to supply suitable lubricant to the work while the machine is in operation.

Either the pulley 9 or the worm wheel 10 may be given a driving connection with the hollow spindle 2 by means of the following clutch mechanism. The clutch device 16 is made slidable on, but rotatable with the hollow spindle in the ordinary manner, and this clutch device is provided with the usual shifter ring 17 actuated by means of the shifter lever 18 in the ordinary manner. The pulley 9 has a positive clutch member 19 formed on or secured to the side of its hub, and the clutch 16 has a corresponding positive clutch member 20 formed on or secured thereto. By shifting the clutch device 16 to the right (see Fig. 1) it is evident that the driving pulley may be given a driving connection with the hollow spindle.

The worm wheel 10 has a clutch member 21 with fine cut teeth formed on or secured to the side of its hub. With this clutch member a clutch member 22 formed on or secured to the side of the clutch 16 is adapted to coöperate. By moving the clutch 16 to the left (see Fig. 1) a driving connection is formed between the hollow spindle and the worm wheel 10. The parts are so proportioned that the limits of the neutral position of the clutch device are comparatively narrow, so that there is very little lost motion or time in shifting from high to low speed or vice versa.

The special arrangement of the clutches described is of great importance. The power absorbed by the work through the medium of the hollow spindle is considerable when on high speed, that is, during the turning operations and the use of the positive clutch is necessary, as a satisfactory friction clutch cannot be employed of sufficiently small dimensions to fit within the available space.

The use of the fine cut teeth on the clutch members 21 and 22 is also important in saving time when shifting from high speed to low speed, as the rate of rotation during low speed is only from one to one and one-half revolutions per minute, so that considerable time would be wasted waiting for the teeth of an ordinary coarse toothed positive clutch to come into alinement for engagement, whereas the fine toothed clutch takes hold very promptly and, as it is under no very heavy strain, is amply strong.

The tools for operating on the plug are carried by a tool carriage 23 slidable transversely of the machine, and as in ordinary lathe practice on a feed carriage 24 secured to the bed of the machine in the manner hereinafter described. The tool carriage is actuated by means of a feed screw 25 journaled on the feed carriage and engaging the nut 26 on the tool holder carriage. This feed screw may be actuated by hand through the medium of the hand wheel 27.

Automatic feed is provided through the medium of the train of gears 28 between the feed screw and the worm wheel 29. This worm wheel 29 is adapted to engage the worm 30 on the feed spindle 31, which is driven by means of the belt drive 32 from the hollow spindle 2. This feed spindle is provided with the universal joint 33, which permits of its outer end being raised or lowered to bring the worm 30 in and out of engagement with the worm wheel 29, and the disengagement is, of course, effected when it is desired to operate the feed screw by hand. The outer end of the feed spindle has its bearing 34 connected with the side of the bed by bolt and slot connection 35 to permit of the desired movement.

The operations to be performed on the plug are the following. The periphery must be roughed off to nearly the desired diameter. The front face of the disk must then be roughed and finished with a slight coning. The periphery must then be given a finishing cut, the back adjacent the periphery faced off and the edge between the periphery and the face slightly chamfered. Finally the periphery is to have a thread milled thereon.

The tool carriage is therefore provided with the following tools arranged as described. On the inner face of the tool holder carriage is secured the block 36 carrying the tool 37 so set as to rough off the periphery as the tool holder passes left to right, (see Fig. 4). This tool is therefore set below the axis of the disk, so that after roughing the disk will pass freely over the tool.

At the top of the tool holder carriage the tools 39 and 40 are secured in position to make two cuts on the face of the plug as the tool holder carriage passes from right to left, (see Fig. 4). These tools are therefore arranged to cut along substantially a horizontal line passing through the axis of the plug.

The next operation is the finishing of the periphery of the plug, the facing of its back and the chamfering of its forward edge. This is effected by means of the tools 41, 42 and 43 suitably supported on the tool holder to act substantially in a horizontal plane in which the axis of the plug lies, (see Fig. 4).

It has been stated that the face of the plug is slightly coned. This means that the movement of the tools 39 and 40 must be at a slight angle to the axis of the plug. The coning is, however, so small, about two one-thousandths of an inch in the radius of the plug that the adjustment required is very fine. I obtain the desired adjustment by securing the feed carriage 24 to the bed by means of bolts 44, which pass loosely through holes in lugs 45 formed on the feed carriage 24. This looseness permits of the feed carriage being slightly rocked and held as rocked by tightening up nuts on the bolts 44. The extent of the rocking, however, requires to be accurately limited. I therefore provide lugs 46, on the bed of the machine, which carry the adjusting screws 47, which form stops to limit the swing of the feed carriage.

After the turning is completed, the thread is cut. For the purpose of cutting this thread I employ a milling cutter 48, which is secured to the spindle 49 journaled in the bearing 50, which is movable in suitable guides on the tool carriage parallel to the axis of the plug. A pulley 51 is secured to the spindle 49 and is driven from the line shafting. The milling cutter is brought into operation by moving the tool holder carriage to the limit of its movement to the right, (see Fig. 4).

The cutting of the thread, of course, requires that the milling cutter move longitudinally of the axis of the plug during cutting. This movement is effected by means of the chaser 52, which is suitably supported from the bearing of the spindle of the milling cutter and is adapted to engage the thread 53 formed preferably on the external surface of the chuck 3. The depth of the cut is regulated by means of the adjusting screw 54 which limits the movement of the tool carriage holder to the right, (see Fig. 4). As the milling cutter wears, adjustment of this stop is of course necessary. This means that the chaser 52 must also be adjusted to permit of the milling cutter moving up to its work. The chaser is therefore made as a separate piece from the holder or support 55, which is connected with the bearing of the milling cutter spindle and is secured thereto by means of the clamping screw and slot connections 56, adjustment being facilitated by the adjusting screws 66.

It is evident that the threads on the chaser and threads on the chuck must be in accurate alinement before they can engage. It is also evident that their alinement will depend on the angular position of the spindle 2. Therefore, by rotating the spindle to a suitable position, the threads may be brought into alinement. To determine this position I provide on a suitable part rotating with the spindle a shoulder which may be brought into engagement with a movable stop. For this purpose I preferably form a ratchet tooth notch 57 on the rim of the collar 67 secured to the hollow spindle (see particularly Fig. 6) and clamped thereto so as to be rotarily adjustable by means of the set screw 68. With this coöperates the pawl 59 suitably pivoted on some stationary part of the apparatus. When the spindle is rotating in the normal direction, the pawl throws out. If the spindle, however, be rotated backward by hand, the point of the pawl will engage in the notch 57, which thus defines the position of the spindle 2 at which the chaser will properly engage the threads 53 on the chuck.

Having set out the construction of the apparatus I will now briefly set forth the cycle of operations in finishing a plug.

The hand wheel 6 is operated by turning it to the right to cause the collet 4 to expand. The plug is then inserted as shown in Fig. 1 and the hand wheel rotated to the left to cause the collet to tightly clamp the same. The shifter lever 18 is then operated to throw the high speed drive into gear. The tool carriage holder is then, by the operation of the hand wheel 27, drawn to the right, (see Fig. 4) to cause the tool 37 to take its roughing cut on the periphery of the disk. The tool holder carriage may then be moved by hand to bring the tools 39 and 40 into action. The automatic feed is then thrown in by lifting the outer end of the feed spindle 31. This is held up by means of the dog 60 pivoted intermediate its ends on the feed carriage and having its lower end engaging under a projection 61 on the bearing 34 of the feed spindle. The upper end of this dog 60 lies in the path of the finger 62, which is slidable in an undercut groove 63 on the tool carriage holder and which may be clamped therein in any position by means of the bolt 64. This finger 62 is so set that it will engage the upper end of the dog 60 and thus disengage the feed spindle just before the tools 41, 42 and 43 are ready to take their cuts on the plug.

A further feed is then effected by hand as it is desirable that the finishing cut of the tool 41, which is exceedingly light, should be under the control of the operator. An adjusting screw 65 screwed through the feed carriage in a position to engage the nut 26 serves as a stop to limit the movement of the tool holder carriage to the right, (see Fig. 3) and thus prevents the operator taking too deep a finishing cut on the periphery of the plug.

After the completion of the turning operations, the shifter lever 18 is moved to its neutral position, the dog 59 engaged with the notch 57, the milling cutter brought into position, and the spindle thrown into low gear as hereinbefore described.

After the milling is completed and the milling tool moved out of engagement with the work it may be shifted back to its initial position by means of the shifter lever 18. The hand wheel is then rotated to release the plug and a new one inserted ready for the recommencement of the cycle of operations described.

If the spindle is in driving engagement with the worm gear, it is effectively held from turning when the hand wheel is rotated to tighten or slacken the collet. The clutch device 16 will be in neutral position when the spindle is rotated by means of the hand wheel to bring the threads of the chuck and chaser into alinement as hereinbefore described.

The device described is exceedingly compact and convenient, and all the movements may be effected by the operator without moving from his position, all the parts being within the reach of either his right or his left hand. The time lost in effecting the changes in speed and adjustment is exceedingly small, so that the output of the device is much greater than with ordinary lathes. As places where lost motion or wear can occur are reduced to a minimum, and the bearing surfaces are both long and large, the apparatus will not only do its work accurately but will maintain the accuracy after long use.

What I claim as my invention is:

1. In apparatus of the class described the combination of a spindle provided with a chuck at one end; a two-speed drive; controlling means for the drive; a tool holder carriage movable transversely of the apparatus; turning tools carried thereby; a milling cutter and spindle therefor; a bearing for said spindle slidable on said carriage longitudinally of the apparatus; and means for moving said bearing.

2. In apparatus of the class described the combination of a spindle provided with a chuck at one end; a two-speed drive; controlling means for the drive; a tool holder carriage movable transversely of the apparatus; turning tools carried thereby; a milling cutter journaled on said carriage to cut transversely of the apparatus; means for moving the cutter longitudinally of the apparatus comprising a chaser adapted to move the cutter; and a thread rotatable with the driving spindle of the apparatus and with which the chaser engages when the cutter is in working position.

3. In apparatus of the class described the combination of a spindle provided with a chuck at one end; a two-speed drive; controlling means for the drive; a tool holder carriage movable transversely of the apparatus; turning tools carried thereby; a milling cutter journaled on said carriage to cut transversely of the apparatus; means for moving the cutter longitudinally of the apparatus comprising a chaser arm adapted to move the cutter, a chaser adjustably connected to the arm so that it may be set radially of the milling cutter, and a thread rotatable with the driving spindle of the apparatus and with which the chaser engages when the cutter is in working position.

4. In apparatus of the class described the combination of a spindle provided with a chuck at one end; a two-speed drive; controlling means for the drive; a tool holder carriage movable transversely of the apparatus; turning tools carried thereby; a milling cutter journaled on said carriage to cut transversely of the apparatus; means for moving the cutter longitudinally of the apparatus comprising a chaser arm adapted to move the cutter, a chaser adjustably connected to the arm so that it may be set radially of the milling cutter; a thread rotatable with the driving spindle of the apparatus and with which the chaser engages when the cutter is in working position; and means for limiting the movement of the carriage bringing the milling cutter toward its work.

5. In apparatus of the class described the combination of a spindle provided with a chuck at one end; a two-speed drive; controlling means for the drive; a feed carriage oscillatable on the frame of the apparatus; a tool holder carriage movable on said feed carriage transversely of the apparatus; turning tools carried thereby; a milling cutter journaled on said carriage to cut transversely of the apparatus; and means for moving the cutter longitudinally of the apparatus.

6. In apparatus of the class described the combination of a spindle provided with a chuck at one end; a two-speed drive; controlling means for the drive; a tool holder carriage movable transversely of the apparatus; turning tools carried thereby; a milling cutter journaled on said carriage to cut transversely of the apparatus; means for moving the cutter longitudinally of the apparatus comprising a chaser adapted to move the cutter; a thread rotatable with the driving spindle of the apparatus and with which the chaser engages when the cutter is in working position; a part rotating with the spindle provided with a peripheral notch; and a pawl pivoted on a stationary part adapted to engage in the notch when the spindle is rotated backward and to ride over the notch when the spindle is rotated forwardly.

7. In apparatus of the class described the combination of a spindle provided with a chuck; a tool holder carriage movable transversely of the apparatus; a turning tool carried thereby set to operate on the periphery of the work from below as the tool passes it in one direction; a set of facing tools set to operate on the face of the work as they move past it in the opposite direction; and a set of tools adapted to operate on the periphery and edges of the work when moved up to it by a continuation of movement of the carriage in the direction of motion during facing.

8. In apparatus of the class described the combination of a spindle provided with a chuck; a tool holder carriage movable transversely of the apparatus; a turning tool carried thereby set to operate on the periphery of the work from below as the tool passes it in one direction; a set of facing tools set to operate on the face of the work as they move past it in the opposite direction; a set of tools adapted to operate on the periphery and edges of the work when moved up to it by a continuation of movement of the carriage in the direction of motion during facing; and a milling cutter journaled on said tool holder carriage and so located as to be adapted to be brought into action by a movement of the carriage in the original direction past the point at which the roughing tools were brought into action.

Signed at Toronto, Ont., this 29th day of November, A. D. 1915, in the presence of the two undersigned witnesses.

EDWIN J. BANFIELD.

Witnesses:
E. P. HALL,
A. M. LEWIS.

Copies of this patent may be obtained for five cents each, by addressing the "Commissioner of Patents, Washington, D. C."